(12) United States Patent
Lee

(10) Patent No.: US 11,280,468 B2
(45) Date of Patent: Mar. 22, 2022

(54) HIDDEN LIGHT APPARATUS OF GRILL FOR VEHICLE

(71) Applicants: Hyundai Motor Company, Seoul (KR); Kia Motors Corporation, Seoul (KR)

(72) Inventor: Soon Il Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/083,528

(22) Filed: Oct. 29, 2020

(65) Prior Publication Data

US 2021/0364145 A1 Nov. 25, 2021

(30) Foreign Application Priority Data

May 19, 2020 (KR) .......................... 10-2020-0059837

(51) Int. Cl.
*F21S 43/40* (2018.01)
*F21S 43/31* (2018.01)
(Continued)

(52) U.S. Cl.
CPC ............ *F21S 43/31* (2018.01); *B60Q 1/0035* (2013.01); *F21S 43/33* (2018.01); *F21S 43/40* (2018.01)

(58) Field of Classification Search
CPC .. F21S 41/28; F21S 41/37; F21S 41/40; F21S 41/43; F21S 41/50; F21S 41/55;
(Continued)

(56) References Cited

U.S. PATENT DOCUMENTS 6,367,949 B1 * 4/2002 Pederson ............. B60Q 1/2611
362/240
6,488,394 B1 * 12/2002 Mabe ...................... B32B 15/08
362/510
(Continued)

FOREIGN PATENT DOCUMENTS

JP 6194540 B2 9/2017
KR 20150131787 A 11/2015
(Continued)

OTHER PUBLICATIONS

Machine translation of KR 1020210061753, publication of Application KR 1020190149664, retrieved from http://www.kipris.or.kr/enghome/main.jsp on Jun. 15, 2021 (Year: 2021).*
(Continued)

*Primary Examiner* — Rajarshi Chakraborty
*Assistant Examiner* — Steven Y Horikoshi
(74) *Attorney, Agent, or Firm* — Mintz Levin Cohn Ferris Glovsky and Popeo, P.C.; Peter F. Corless

(57) ABSTRACT

A hidden light apparatus for a vehicle is configured so that light is irradiated from a grill of the vehicle, and when the light is not irradiated from the grill, a shape of an irradiation area and a pattern shape of the grill are identical with each other to maintain a design of the grill. The hidden light apparatus includes the grill having an external surface in a pattern including a plurality of grids; a grid panel coupled to one of the grids in a same shape to form a surface of the one grid; a light source provided inside the grid panel and irradiating light; and a reflector provided inside the grid panel, wherein when the light source is turned off, the grid panel constitutes the pattern of the grill, and when the light source is turned on, the grid panel functions to illuminate the vehicle.

11 Claims, 11 Drawing Sheets

(51) Int. Cl.
*F21S 43/33* (2018.01)
*B60Q 1/00* (2006.01)

(58) Field of Classification Search
CPC .......... F21S 41/285; F21S 43/14; F21S 43/26; F21S 43/31; F21S 43/33; F21S 43/40; F21S 43/50; F21S 43/51; B60Q 1/0035; B60Q 1/2642; B60Q 1/2653; B60Q 1/2661; B60Q 1/28; B60Q 1/38; B60Q 1/46; B60Q 1/50; B60Q 1/503; F21W 2104/00; B60R 19/52; B60R 2019/525; B60R 2019/527
See application file for complete search history.

(56) References Cited

U.S. PATENT DOCUMENTS

| | | |
|---|---|---|
| 10,059,256 B1 | 8/2018 | Diedrich |
| 10,214,140 B2 | 2/2019 | Belcher et al. |
| 10,627,092 B2 | 4/2020 | Brown et al. |
| 10,793,094 B2 | 10/2020 | Salter et al. |
| 10,920,950 B1 | 2/2021 | Glickman et al. |
| 2008/0049436 A1* | 2/2008 | Yoshihara ............... F21V 29/00 362/488 |
| 2010/0232174 A1* | 9/2010 | Arakawa .................. F21V 3/10 362/547 |
| 2011/0317442 A1* | 12/2011 | Makiuchi ................ F21S 43/14 362/519 |
| 2021/0148535 A1* | 5/2021 | Kim ....................... F21S 41/285 |

FOREIGN PATENT DOCUMENTS

| | | |
|---|---|---|
| KR | 20150136517 A | 12/2015 |
| KR | 2017-0062405 A | 6/2017 |
| KR | 1020210061753 A * | 5/2021 |

OTHER PUBLICATIONS

U.S. Appl. No. 17/083,378, filed 2020.*
U.S. Appl. No. 17/083,421, filed 2020.*
U.S. Appl. No. 17/083,483, filed 2020.*
Hyundai Motor Company (Dec. 31, 2019) "Two Faces of Grandeur, Day and Night of The New Grandeur", 24 pages.

* cited by examiner

FIG. 7

| POINT | TARGET VALUE(MIN) | TARGET VALUE(MAX) | MEASUREMENT VALUE(cd) | |
|---|---|---|---|---|
| 10U-5L | 80 | 1200 | 140.457 | |
| 10U-V | 80 | 1200 | 152.033 | |
| 10U-5R | 80 | 1200 | 142.964 | |
| 5U-20L | 40 | 1200 | 94.053 | |
| 5U-10L | 80 | 1200 | 230.495 | |
| 5U-V | 280 | 1200 | 311.403 | |
| 5U-10R | 80 | 1200 | 218.267 | |
| 5U-20R | 40 | 1200 | 81.162 | |
| H-20L | 100 | 1200 | 122.707 | |
| H-10L | 280 | 1200 | 315.988 | |
| H-5L | 360 | 1200 | 402.399 | |
| HV | 400 | 1200 | 424.918 | |
| H-5R | 360 | 1200 | 380.490 | |
| H-10R | 280 | 1200 | 288.476 | |
| H-20R | 100 | 1200 | (98.373) | DISSATISFACTION |
| 5D-20L | 40 | 1200 | 89.793 | |
| 5D-10L | 80 | 1200 | 220.000 | |
| 5D-V | 280 | 1200 | 294.080 | |
| 5D-10R | 80 | 1200 | 208.281 | |
| 5D-20R | 40 | 1200 | 84.301 | |

FIG. 8

| POINT | TARGET VALUE(MIN) | TARGET VALUE(MAX) | MEASUREMENT VALUE(cd) |
|---|---|---|---|
| 10U-5L | 80 | 1200 | 160.083 |
| 10U-V | 80 | 1200 | 172.719 |
| 10U-5R | 80 | 1200 | 163.548 |
| 5U-20L | 40 | 1200 | 107.992 |
| 5U-10L | 80 | 1200 | 264.631 |
| 5U-V | 280 | 1200 | 358.990 |
| 5U-10R | 80 | 1200 | 249.958 |
| 5U-20R | 40 | 1200 | 89.019 |
| H-20L | 100 | 1200 | 141.680 |
| H-10L | 280 | 1200 | 352.264 |
| H-5L | 360 | 1200 | 434.395 |
| HV | 400 | 1200 | 455.692 |
| H-5R | 360 | 1200 | 407.494 |
| H-10R | 280 | 1200 | 308.040 |
| H-20R | 100 | 1200 | 107.126 |
| 5D-20L | 40 | 1200 | 103.682 |
| 5D-10L | 80 | 1200 | 251.283 |
| 5D-V | 280 | 1200 | 335.145 |
| 5D-10R | 80 | 1200 | 235.794 |
| 5D-20R | 40 | 1200 | 92.412 |

FIG. 9

| POINT | TARGET VALUE(MIN) | TARGET VALUE(MAX) | MEASUREMENT VALUE(cd) |
|---|---|---|---|
| 10U-5L | 80 | 1200 | 138.912 |
| 10U-V | 80 | 1200 | 149.206 |
| 10U-5R | 80 | 1200 | 141.611 |
| 5U-20L | 40 | 1200 | 90.043 |
| 5U-10L | 80 | 1200 | 224.159 |
| 5U-V | 280 | 1200 | 320.598 |
| 5U-10R | 80 | 1200 | 237.150 |
| 5U-20R | 40 | 1200 | 93.441 |
| H-20L | 100 | 1200 | 114.927 |
| H-10L | 280 | 1200 | 302.209 |
| H-5L | 360 | 1200 | 391.853 |
| HV | 400 | 1200 | 433.726 |
| H-5R | 360 | 1200 | 406.943 |
| H-10R | 280 | 1200 | 318.099 |
| H-20R | 100 | 1200 | 122.523 |
| 5D-20L | 40 | 1200 | 105.034 |
| 5D-10L | 80 | 1200 | 247.944 |
| 5D-V | 280 | 1200 | 338.486 |
| 5D-10R | 80 | 1200 | 252.940 |
| 5D-20R | 40 | 1200 | 99.637 |

HIDDEN LIGHT APPARATUS OF GRILL FOR VEHICLE

CROSS REFERENCE TO RELATED APPLICATION

The present application claims under 35 U.S.C. § 119(a) the benefit of Korean Patent Application No. 10-2020-0059837, filed May 19, 2020, the entire contents of which are incorporated by reference herein.

BACKGROUND

1. Technical Field

The present disclosure relates to a hidden light apparatus in which light is irradiated from a grill of a vehicle.

2. Description of the Related Art

In general, a vehicle includes one or more lamps (exterior lights) for the purpose of making it possible to see objects well in a driving direction at night or notifying another vehicle's driver or a pedestrian on a road of a driving state of the vehicle. For example, every vehicle is provided with headlights (each of which is also referred to as a lamp (or headlamp), which function to illuminate a road ahead of the vehicle.

A lamp mounted on a vehicle may be classified into a head lamp, a fog light, a turn indicator light, a brake light, a backup light, or the like, which may be set differently depending on a direction in which light is irradiated toward a road surface.

Such a vehicle lamp may provide identification by emitting light irradiated from a light bulb in a forward direction. Recently, a light guide has been applied to improve an exterior design so that light may be irradiated while having a specific image.

However, a vehicle has limited space for accommodating a lamp (e.g., head lamp or rear lamp) of the vehicle. As a result, it is not possible to exchange information using the lamp, and there is a limitation in terms of design.

The contents described as the related art have been provided only to assist in understanding the background of the present disclosure and should not be considered as corresponding to the related art known to those having ordinary skill in the art.

SUMMARY

An object of the present disclosure is to provide a hidden light apparatus in which light is irradiated from a grill of a vehicle, and when the light is not irradiated from the grill, a shape of an irradiation area and a pattern shape of the grill are identical with each other to maintain a design of the grill.

According to an embodiment of the present disclosure, a hidden light apparatus includes: a grill having an external surface in a pattern including a plurality of grids; a grid panel coupled to one of the grids in a same shape to form a surface of the one grid and provided in each of some or all of the plurality of grids; a light source provided inside the grid panel and irradiating light; and a reflector provided inside the grid panel to allow the light irradiated from the light source to be incident thereto and reflecting the incident light to be moved toward the grid panel, wherein when the light source is turned off, the grid panel constitutes the pattern of the grill, and when the light source is turned on, the grid panel functions to illuminate the vehicle as the light is irradiated through the grid panel by the reflector.

The light source and the reflector may constitute an optical module, the grill may include a plurality of grid panels having the same shape, and the optical module may be provided for each of some or all of the plurality of grid panels.

The grid panel may include a plurality of irradiation areas forming a grid shape.

The light source and the reflector may constitute an optical module, and the pattern of the grill and a shape of the irradiation areas of the optical module may be a diamond shape.

The light source and the reflector may constitute an optical module, and light of the optical module may be irradiated to outside the vehicle through a perforated hole formed in each of the irradiation areas.

An entire area of the perforated hole may be greater than at least ½ of an entire area of the irradiation area.

The perforated hole may be located in an upper portion of the irradiation area, and a non-perforated portion through which the light is not transmitted may be formed in a lower portion of the irradiation area.

The grid panel may include a plurality of irradiation areas forming a grid shape, and an optical module may include the light source irradiating light, the reflector reflecting the light of the light source, and a lens forming the irradiation areas in which the light reflected through the reflector is emitted to outside the vehicle and formed in a shape that is the same as the pattern of the grill.

The lens may include a plurality of optic parts protruding outwardly, each of the optic parts having a respective one of the irradiation areas.

Each of the optic parts may include an upper side surface and a lower side surface protruding at an angle from positions spaced apart from each other and extending to meet each other, and each of the irradiation areas may include a perforated hole formed in an upper portion thereof and a non-perforated portion formed in a lower portion thereof, the perforated hole through which the light is transmitted and the non-perforated portion through which the light is not transmitted.

The upper side surface and the lower side surface of the optic part may extend at the same angle to meet each other, and a point at which the irradiation area is divided into the perforated hole and the non-perforated portion may be disposed to be lower than a point at which the upper surface and the lower side surface of the optic part are connected to each other.

A shape of the optic parts may be the same as the pattern of the grill.

The pattern of the grill, a shape of the lens, a shape of the irradiation areas, and a shape of the optic parts may be a diamond shape.

The lens may include: a transmitting layer disposed on an outer side of the lens and transmitting the light therethrough; a reflecting layer coupled to an inner side of the transmitting layer and reflecting the light; and a coating layer coupled to an inner side of the reflecting layer and having a lower light transmittance than the transmitting layer, and the reflecting layer and the coating layer may include a plurality of perforated holes spaced apart from each other, each being opened toward the transmitting layer at the same position of the reflecting layer and the coating layer, to form the plurality of irradiation areas.

The lens may include an outer lens and an inner lens, the outer lens including the transmitting layer, the reflecting layer, and the coating layer, and the inner lens disposed inside the outer lens and having a plurality of protrusions or grooves to scatter the light irradiated from the optical module.

BRIEF DESCRIPTION OF THE DRAWINGS

FIGS. 7 to 9 are tables regarding the results of the hidden light device shown in FIG. 1.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a hidden light apparatus according to a preferred embodiment of the present disclosure will be described with reference to the accompanying drawings.

Figure 1:
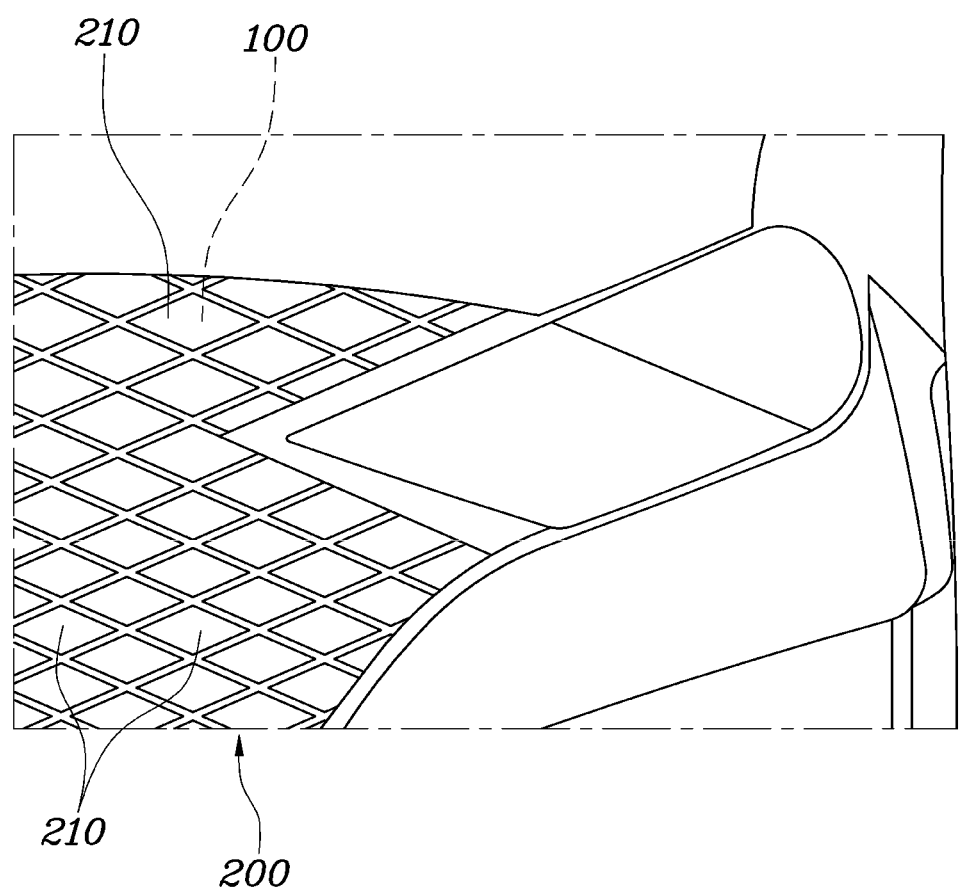
FIG. 1 is a view showing a hidden light apparatus according to an embodiment of the present disclosure.
Figure 10:
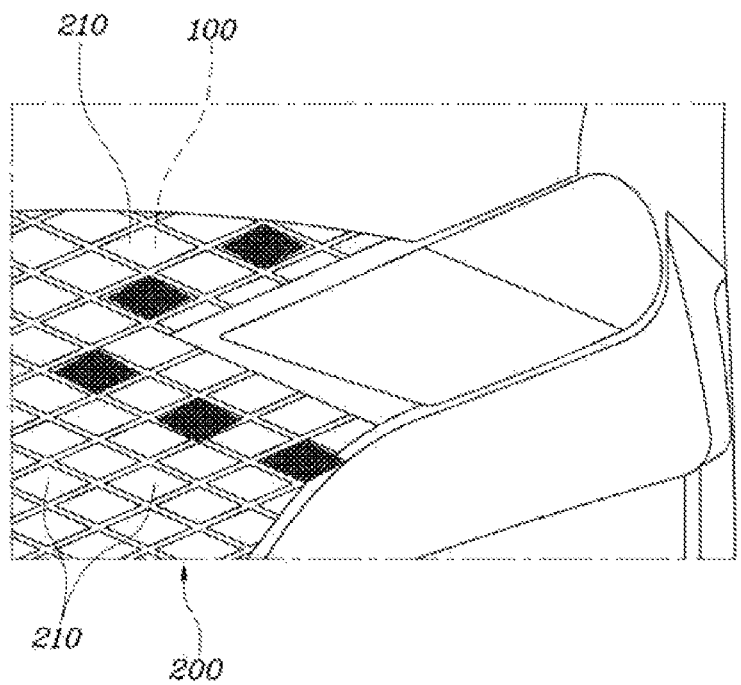
FIGS. 10 and 11 are views showing that a message is delivered through the hidden light apparatus illustrated in FIG. 1.
Figure 11:
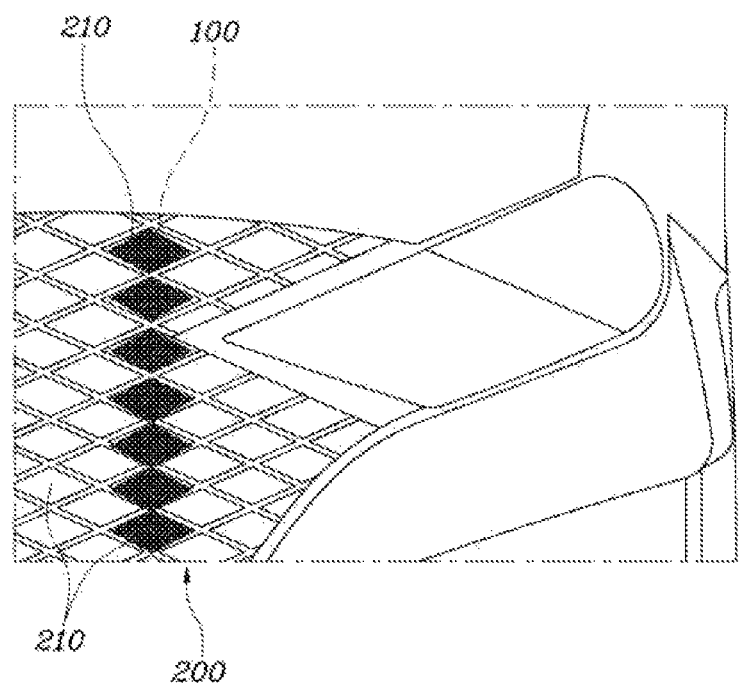

FIG. 1 is a view showing a hidden light apparatus according to an embodiment of the present disclosure, FIGS. 2 to 6 are views for explaining the hidden light apparatus illustrated in FIG. 1, and FIGS. 10 and 11 are views showing that a message is delivered through the hidden light apparatus illustrated in FIG. 1.

Figure 2:
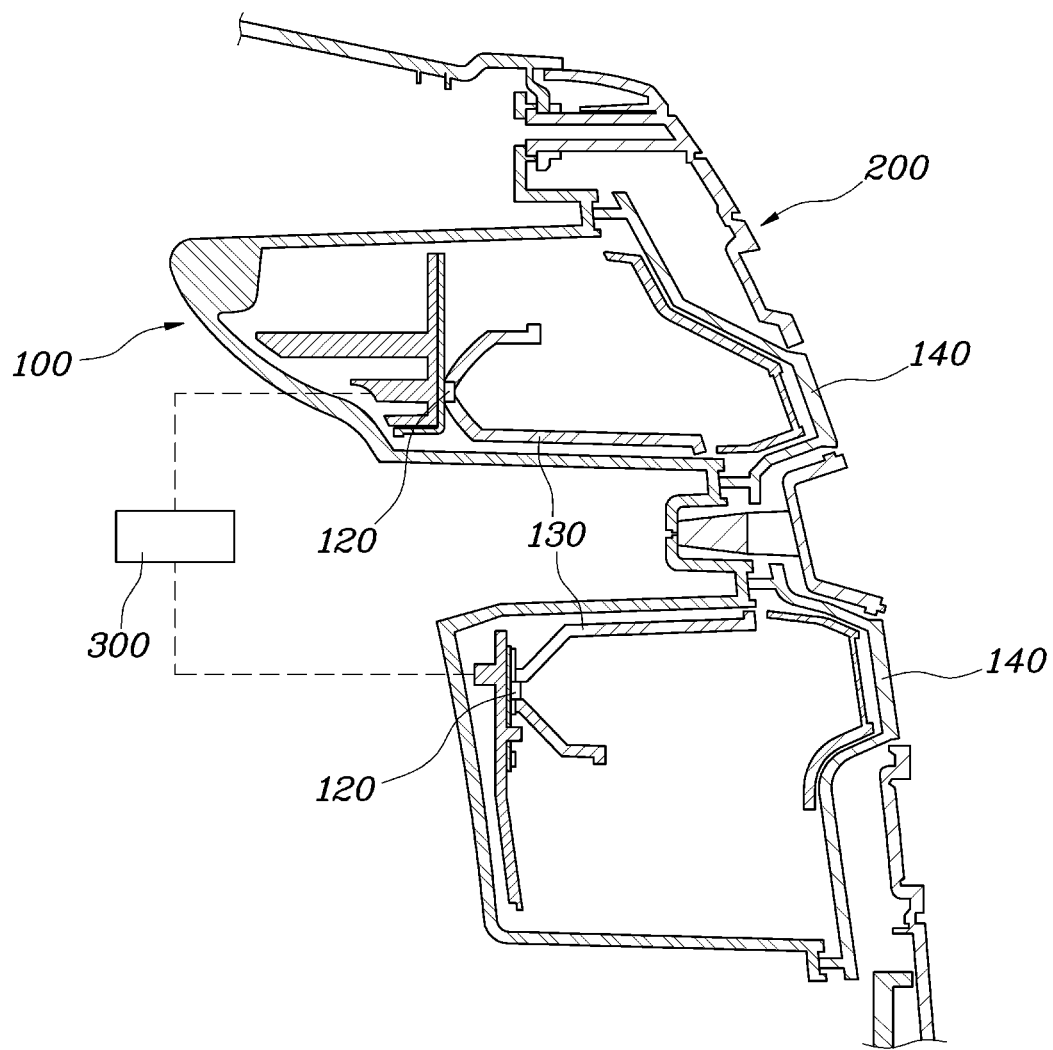
FIGS. 2 to 6 are views for explaining the hidden light apparatus illustrated in FIG. 1.

In the hidden light apparatus according to the present disclosure as illustrated in FIGS. 1 and 2, an optical module 100, which implements an illumination of a vehicle, is provided in a grill 200 to irradiate light of the optical module 100 through the grill 200. By providing the optical module 100 irradiating light in the grill 200 provided in the vehicle to irradiate the light from the optical module 100 to outside the vehicle through the grill 200, it is possible to irradiate the light from the grill 200. That is, when the optical module 100 does not irradiate light, the grill 200 serves as an exterior design depending on its pattern shape, and when the optical module 100 irradiates light, the light is irradiated from the grill 200, and thus the grill 200 serves to illuminate the vehicle.

In particular, in the present disclosure, the pattern shape of the grill 200 and a shape of irradiation areas 110 of the optical module 100 in which light is irradiated are formed to be the same. As shown in FIG. 1, by forming the pattern shape of the grill 200 and the shape of the irradiation areas 110 of the optical module 100 in which light is irradiated to be the same, a pattern design of the grill 200 may be maintained, and a sense of difference caused by the light irradiation from optical module 100 may be reduced.

That is, the design of the grill 200 may be determined by arranging a pattern in a specific shape for the grill 200. The pattern of the grill 200 is an important factor expressing an overall design of the grill 200. When light is irradiated through the optical module 100, if the shape of the irradiation area 110 does not correspond to the pattern shape of the grill 200, the sense of difference may occur and the design of the grill 200 may be degraded.

Therefore, by forming the pattern shape of the grill 200 and the shape of the irradiation areas 110 of the optical module 100 to be the same, although light is irradiated through the optical module 100, the light may be irradiated in the same shape as the pattern shape of the grill 200, thereby maintaining the design of the grill 200 and improving an aesthetic impression.

Here, the grill 200 may include a plurality of grid panels 210 having the same pattern shape, and the optical module 100 may be arranged in each of some or all of the plurality of grid panels 210. As shown in FIG. 1, while the grill 200 includes the plurality of grid panels 210, all of the grid panels 210 may have the same shape. For the shape of the grid panels 210, various shapes such as polygonal and circular shapes may be applied.

Here, the optical module 100 may be provided on the grid panel 210 of the grill 200 to irradiate light from a corresponding grid panel 210 when the light of optical module 100 is irradiated. That is, in the plurality of grid panels 210 forming the grill 200, a grid panel 210 on which the optical module 100 is configured to allow the light of the optical module 100 to be irradiated from therethrough, and a grid panel 210 with no optical module 100 provided thereon maintains its own design. Accordingly, light may be irradiated from optical modules 100 depending on the number of grid panels 210 on which the optical modules 100 are provided among the plurality of grid panels 210 and locations thereof, thereby diversifying the design of the grill 200.

That is, when the optical modules 100 are provided on all of the grid panels 210 of the grill 200, light is irradiated from an entire area of the grill 200, thereby securing an amount of light and intuitively implementing an illuminating function. Meanwhile, when the optical modules 100 are arranged on some of the grid panels 210 of the grill 200, light is irradiated from a partial area of the grill 200, thereby improving sensitivity to design. As an embodiment, as illustrated in FIG. 1, a bent shape such as a '<' shape may be implemented. The design may be variously implemented by selectively providing the optical modules 100 on the plurality of grid panels 210 to irradiate the light of the optical modules 100 therefrom.

In the present disclosure, the pattern shape of the grill 200 and the shape of the irradiation areas 110 of the optical module 100 may be a diamond shape. Since the pattern shape of the grill 200 and the irradiation area 110 correspond to each other as the diamond shape, a linear design may be implemented, and the pattern of the grill 200 may be intuitively recognized when the grill 200 is viewed from the outside. In addition, by implementing the pattern image of the grill 200 linearly, when the light of the optical modules 100 is irradiated through the grill 200 to deliver a message, the message may be intuitively recognized.

Figure 3:
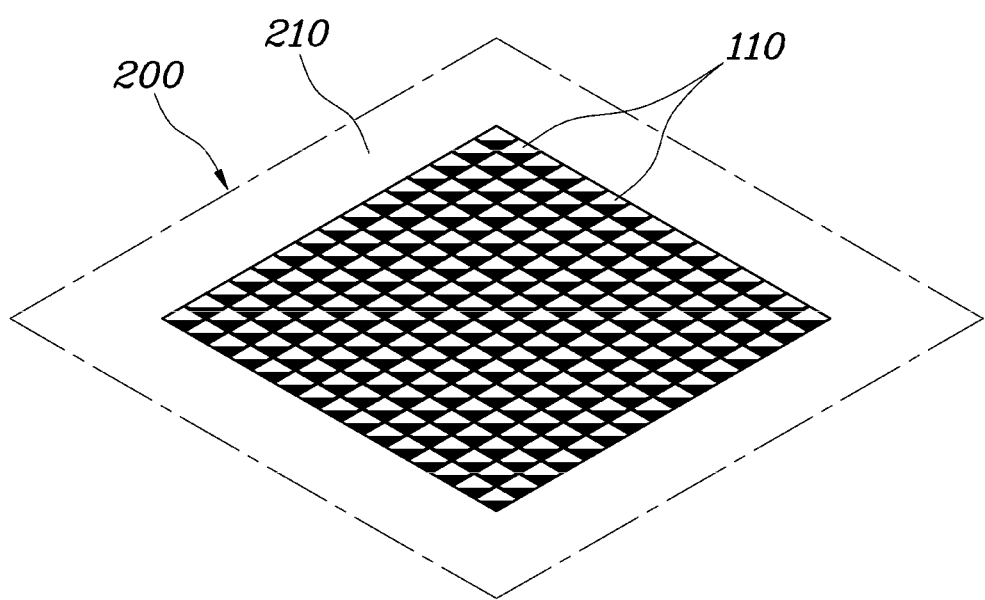

Meanwhile, as illustrated in FIGS. 1 and 3, while the optical module 100, which implements an illumination of a vehicle, is provided in the grill 200, the grid panel 210 may include a plurality of irradiation areas 110 forming a grid shape, the light of the optical module 100 may be irradiated to the outside through a perforated hole 111 formed in the irradiation area 110, and an entire area of the perforated hole 111 may be greater than at least ½ of an entire area of the irradiation area 110. That is, the grill 200 provided in the vehicle includes the optical module 100 for irradiating light, and the light irradiated from the optical module 100 is irradiated to the outside through the grill 200, thereby making it possible to irradiate the light from the grill 200.

Here, the light of the optical module 100 is irradiated to the outside through the perforated hole 111 formed in the irradiation area 110. The perforated hole 111 is an opened portion for allowing light to be emitted from the inside to the outside of the grill 200. By irradiating the light irradiated from the optical module 100 to be emitted to the outside through the perforated hole 111, it may be implemented that the light is irradiated from the grill 200.

That is, the irradiation area 110 of the optical module 100 is an area in which the light of the optical module 100 is moved. When an area of the perforated hole 111 increases with respect to the entire area of the irradiation area 110, a light transmission increases, and when the area of the perforated hole 111 decreases with respect to the entire area of the irradiation area 110, the light transmission decreases. Meanwhile, when the area of the perforated hole 111 increases with respect to the entire area of the irradiation area 110, the inside of the grill 200 is visible in more detail from the outside. Thus, if the perforated hole 111 is excessively large, the design of the grill 200 may be degraded.

Therefore, by forming the entire area of the perforated hole 111 to be greater than at least ½ of the entire area of the irradiation area 110, a transmission of light irradiated from the optical module 100 may be secured, and the inside of the grill 200 may not be visible from the outside to prevent the design of the grill 200 from being degraded.

Here, the entire area of the perforated hole 111 is preferably set to 60% or more of the entire area of the irradiation area 110. Even in a case where the entire area of the perforated hole 111 is set to 50% or more of the entire area of the irradiation area 110, a transmission of light through the optical module 100 may be secured to some extent, but the transmission may be decreased by other processes including painting Thus, the entire area of the perforated hole 111 is set to 60% or more.

This is a result obtained through light distribution efficiency tests according to respective coordinates. The light distribution efficiency test was performed to check a light intensity measurement value (light distribution, [cd]) according to each angle (H—horizontal line, V—vertical line) on a screen. As an example, as an indicator of the light distribution efficiency test, a light intensity measurement value satisfying the regulations relevant to daylight running lights (DRL) may be determined. It may be determined whether a light intensity measurement value according to each coordinate on a 25M-distance screen satisfies the regulations relevant to the DRL. In FIGS. 7 to 9 showing results of the light distribution efficiency tests, point HV denotes an optical center point, which indicates that the light distribution is satisfactory in the range of 400 cd to 1200 cd, U denotes Up, D denotes Down, L denotes Left, and R denotes Right. Based thereon, a degree to which the light distribution is satisfactory may be checked for each coordinate. For example, '10U-5L' is a coordinate of a position that is spaced 10° upward and 5° left apart from a reference point. It may be checked whether a light intensity value measured at the aforementioned position is between 80 cd, which is a minimum target value, and 1200 cd, which is a maximum target value, to determine whether to satisfy the condition for light distribution efficiency.

According to the results of the light distribution efficiency tests, when the entire area of the perforated hole 111 is 50% or less of the entire area of the irradiation area 110, as illustrated in FIG. 7, it may be seen that some of a plurality of points in the irradiation area do not satisfy the condition for light distribution efficiency, and the other points narrowly satisfy the condition for light distribution efficiency.

However, as illustrated in FIG. 8, when the entire area of the perforated hole 111 is 60% or more of the entire area of the irradiation area 110, it may be seen that all of the points satisfy the condition for light distribution efficiency concerning light intensity measurement values.

In addition, when the entire area of the perforated hole 111 is 60% or more of the entire area of the irradiation area 110 in a state where the perforated hole 111 is located in an upper portion of the irradiation area 110, as illustrated in FIG. 9, it may be seen that not only all of the points satisfy the condition for light distribution efficiency concerning light intensity measurement values, but also a higher light intensity is secured.

As described above, the entire area of the perforated hole 111 is preferably set to 60% or more of the entire area of the irradiation area 110, and a sufficient light intensity may be secured when the perforated hole 111 is located in the upper side of the irradiation area 110.

Here, the pattern shape of the grill 200 and the shape of the irradiation areas 110 of the optical module 100 may be the same as a diamond shape, thereby implementing a linear design of the grill 200, such the pattern of the grill 200 is intuitively recognized when the grill 200 is viewed from the outside. In addition, by implementing the pattern image of the grill 200 linearly, when the light of the optical modules 100 is irradiated through the grill 200 to deliver a message, the message may be intuitively recognized.

Figure 4:
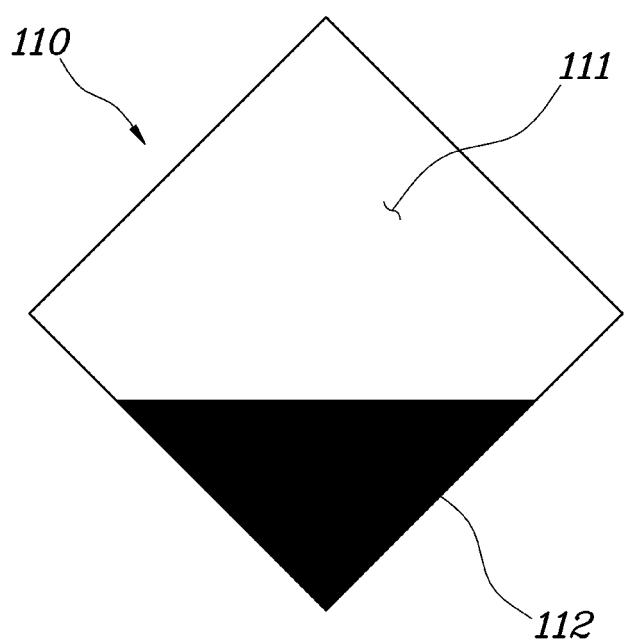

Meanwhile, as illustrated in FIG. 4, while the optical module 100, which implements an illumination of a vehicle, is provided in the grill 200, the light of the optical module 100 is irradiated to the outside through the perforated hole 111 formed in the irradiation area 110, and the perforated hole 111 is located in the upper portion of the irradiation area 110, a non-perforated portion 112 through which light is not transmitted may be formed in a lower portion of the irradiation area 110. That is, by providing the optical module 100 in the grill 200 arranged in the vehicle and irradiating the light irradiated from the optical module 100 to the outside through the grill 200, it is possible to irradiate light from the grill 200.

That is, since the irradiation area 110 is divided into the perforated hole 111 and the non-perforated portion 112, the light irradiated from the optical module 100 is irradiated to the outside through the perforated hole 111 and the light is not projected to the outside in the non-perforated portion 112.

In particular, since the perforated hole 111 is located in the upper portion of the irradiation area 110 and the non-perforated portion 112 is located below the perforated hole 111, the grill 200 may look like jewel when being viewed from the outside. Specifically, the perforated hole 111 is a portion through which the light of the optical module 100 is transmitted. When the grill 200 is viewed from the outside, the inside of the grill 200 is partially visible through the perforated hole 111. In general, the grill 200 of the vehicle is disposed in a lower portion of the vehicle. Accordingly, when the grill 200 is viewed from the outside, the grill 200 is viewed downward from above. By forming the perforated hole 111 in the upper portion of the irradiation area 110 and forming the non-perforated portion 112 in the lower portion of the irradiation area 110, when the grill 200 is viewed from the outside, the non-perforated portion 112 is visible through the perforated hole 111. Since the non-perforated portion 112 is visible when the grill 200 is viewed from the outside and a coating remaining on the non-perforated portion is visible, the grill may look like jewelry, thereby achieving a further luxurious exterior design of the grill 200. In addition, by disposing the perforated hole 111 in the upper portion of the irradiation area 110, the light of the optical module 100 is irradiated upwardly after passing through the perforated hole 111, thereby improving the visibility of the light.

Meanwhile, the perforated hole 111 may occupy 60% of the entire area of the irradiation area 110, and the non-perforated portion 112 may be formed in the remaining area excluding the perforated hole 111. By setting the entire area of the perforated hole 111 to 60% or more of the entire area of the irradiation area 110, even if other processes including painting are performed and a light transmission is decreased, the light transmission may be secured. In addition, by forming the non-perforated portion 112 in the remaining area excluding the perforated hole 111, it may be easily implemented through the non-perforated portion 112 that the grill 200 looks like jewelry when being viewed from the outside.

Meanwhile, while the pattern shape of the grill 200 and the shape of the irradiation areas 110 of the optical module 100 are the same as a diamond form and the entire area of the perforated hole 111 is at least ½ of the entire area of the irradiation area 110, the perforated hole 111 may be formed in a pentagonal shape, and the non-perforated portion 112 may be formed in a triangular shape according to the remaining area of the irradiation area 110.

By forming the pattern shape of the grill 200 and the shape of the irradiation areas 110 of the optical module 100 to be the same as a diamond form as described above, a linear design of the grill 200 may be implemented, thereby intuitively recognizing the pattern of the grill 200 when the grill 200 is viewed from the outside. In addition, since the pattern image of the grill 200 is linearly implemented, when the light of the optical modules 100 is irradiated through the grill 200 to deliver a message, the message may be intuitively recognized.

In addition, by forming the perforated hole 111 such that its entire area is at least ½ of the entire area of the irradiation area 110, the perforated hole 111 may be formed in a pentagonal shape and the non-perforated portion 112 may be formed in a triangular shape according to the remaining area of the irradiation area 110. That is, since the shape of the irradiation areas 110 of the optical module 100 is the diamond shape and the area entire of the perforated hole 111 is at least ½ of the entire area of the irradiation area 110, the perforated hole 111 may be formed in the pentagonal shape. By forming the perforated hole 111 in the pentagonal shape, a sufficient light transmission may be secured in the diamond-shaped irradiation area 110, and it may be easy to form the grill 200 to look like jewelry, while the sense of difference is minimized and the luxurious design is achieved, in a state where the triangular-shape non-perforated portion 112 prevents the light from being irradiated below the perforated hole 111.

In the meantime, while the optical module 100, which implements an illumination of a vehicle, is provided in the grill 200, the optical module 100 may include a light source 120 irradiating light, a reflector 130 reflecting the light of the light source, and a lens 140 forming the irradiation areas 110 in which the light reflected through the reflector 130 is emitted to the outside and formed in a shape that is the same as the pattern shape of the grill 200.

Here, the light source 120 may be formed of a light emitting diode (LED), and the reflector 130 may be formed of a mirror and curved to change a direction of the light irradiated from the light source such that the light is moved to the outside. The lens 140 may be disposed in front of the reflector 130 to emit the light to the outside, and formed in the same shape as the pattern shape of the grill 200 to maintain a pattern design of the grill 200 and reduce a sense of difference caused by the light irradiation from the optical module 100.

The lens 140 may include a plurality of optic parts 144 protruding outwardly, each of the optic parts 144 having a respective one of the irradiation areas. Since the optic parts 144 protrude from the lens 140, a luxurious image may be achieved by the reflected light when the grill 200 is viewed from the outside. To this end, each of the optic parts 144 is preferably disposed to correspond to a respective one of the irradiation areas 110.

Figure 5:
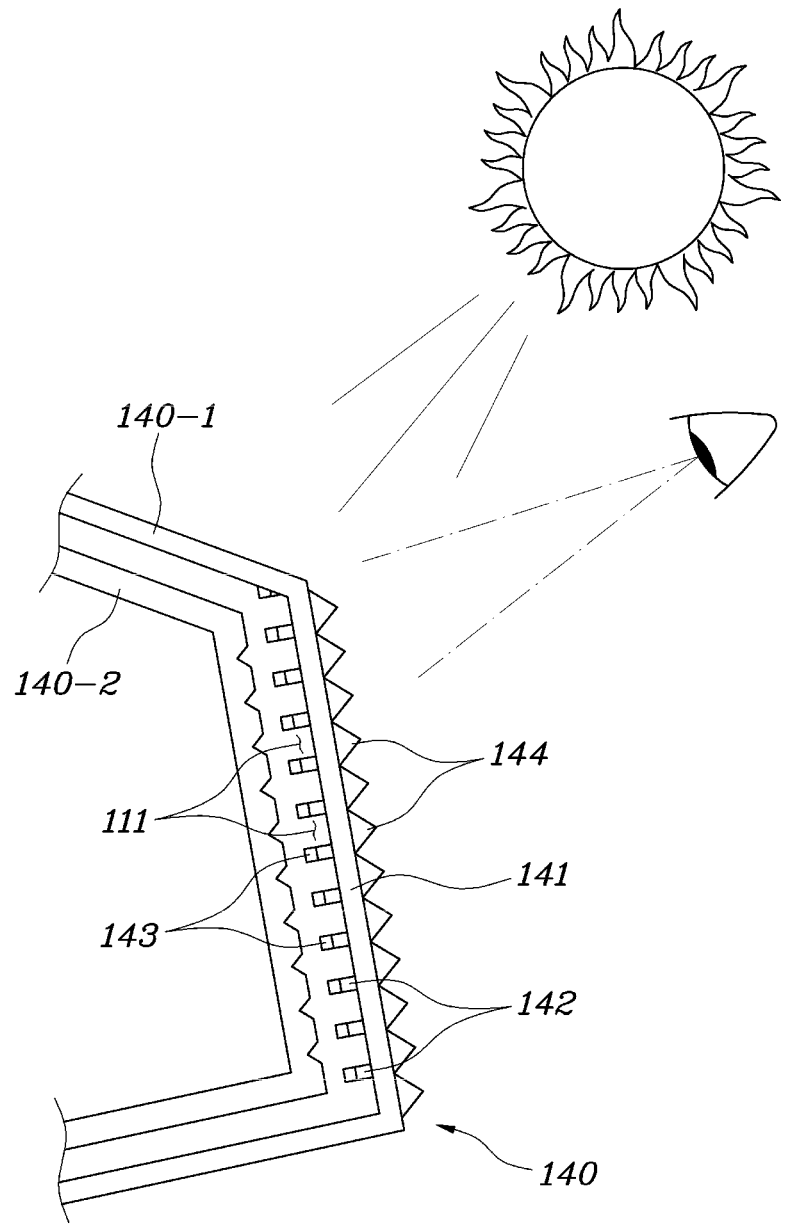
Figure 6:
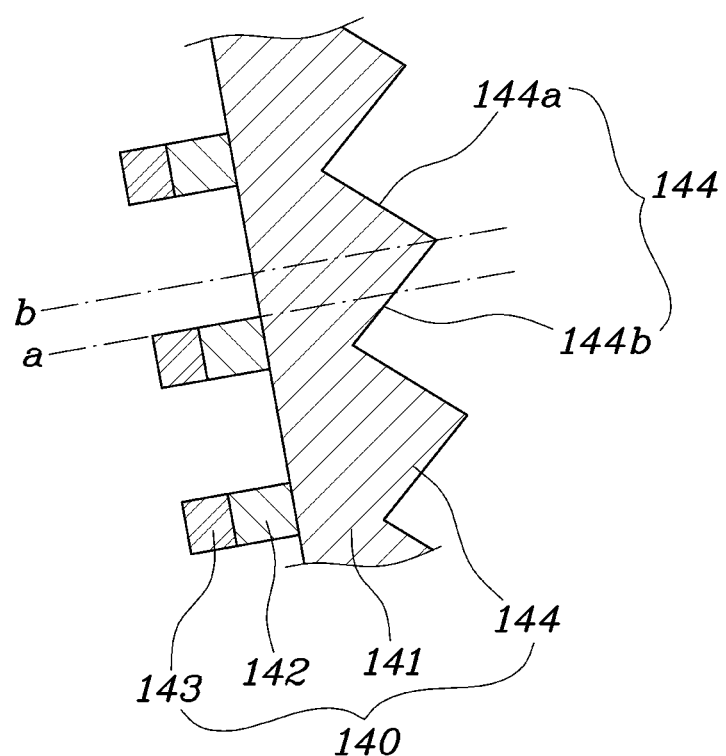

Specifically, as illustrated in FIGS. 5 and 6, the optic part 144 may include an upper side surface 144a and a lower side surface 144b protruding at an angle from positions spaced apart from each other and extending to meet each other, while the irradiation area 110 includes the perforated hole 111 in the upper portion thereof and the non-perforated portion 112 in the lower portion thereof, the perforated hole 111 through which light is transmitted and the non-perforated portion 112 through which light is not transmitted.

Since the optic part 144 includes the upper side surface 144a and the lower side surface 144b connected to each other in an inclined state, when the grill 200 is viewed from the outside, sunlight is reflected by the upper side surface 144a but is not reflected by the lower side surface 144b, resulting in a difference in image between the upper side surface 144a and the lower side surface 144b. In addition, since the perforated hole 111 is formed in the upper portion of the irradiation area 110 for light to be transmitted therethrough and the non-perforated portion 112 is formed in the lower portion of the irradiation area 110 to prevent light from being transmitted therethrough, the non-perforated portion 112 is visible when the grill 200 is viewed from the outside, and accordingly, the grill 200 looks like jewelry.

To this end, while the upper side surface 144a and the lower side surface 144b of the optic part 144 extend at the same angle to meet each other, a point (a) at which the irradiation area 110 is divided into the perforated hole 111 and the non-perforated portion 112 may be disposed to be lower than a point (b) at which the upper side surface 144a and the lower side surface 144b of the optic part 144 are connected to each other. Accordingly, the entire area of the perforated hole 111 may be greater than at least ½ of the entire area of the irradiation area 110.

That is, since the upper side surface 144a and the lower side surface 144b of the optic part 144 extend at the same angle, such that the optic part 144 has an isosceles triangle shape, and the point (a) at which the irradiation area 110 is divided into the perforated hole 111 and the non-perforated portion 112 is disposed to be lower than the point (b) at which the upper side surface 144a and the lower side surface 144b of the optic part 144 are connected to each other, when the grill 200 is viewed from the outside, the visibility of the non-perforated portion 112 through the perforated hole 111 is secured.

Specifically, the grill 200 of the vehicle is generally disposed in the lower portion of the vehicle. Accordingly, when the grill 200 is viewed from the outside, the grill 200 is viewed downward from above. When the grill 200 of the vehicle is viewed from the outside, sunlight is reflected by the upper side surface 144a of the optic part 144 formed on the lens 140 but is not reflected by the lower side surface 144b of the optic part 144, thereby implementing a design according to a difference in reflection image between the upper side surface 144a and the lower side surface 144b. Further, since when the inside of the grill 200 is viewed through the upper side surface 144a of optic part 144, the non-perforated portion 112 is visible through the perforated hole 111 and the coating remaining on the non-perforated portion 112 is visible, the grill 200 may look like jewelry, thereby achieving a luxurious exterior design of the grill 200. In addition, since the point (a) at which the irradiation area 110 is divided into the perforated hole 111 and the non-perforated portion 112 is disposed to be lower than the point (b) at which the upper side surface 144a and the lower side surface 144b of optic part 144 are connected to each other, the entire area of the perforated hole 111 may increase, thereby securing a light transmission of the optical module 100 when the grid panel 210 functions as an illumination.

Meanwhile, the shape of the optic part 144 may be the same as the pattern shape of the grill. By forming the shape of the optic part 144 to be the same as the pattern shape of the grill 200, a pattern design of the grill 200 may be maintained, and a sense of difference according to the light irradiation from the optical module 100 may be reduced. Since the pattern shape of the grill 200 and the shape of the optic part 144 are the same, a planned design may be maintained. Although light is irradiated through the optical module 100, the light may be irradiated in the same shape as the pattern shape of the grill 200, thereby maintaining the design of the grill 200 and improving an aesthetic impression.

In particular, the pattern shape of the grill 200, the shape of the lens 140, the shape of the irradiation areas 110, and the shape of the optic part 144 may be the same as a diamond shape. Since the shape of the optic part 144, the pattern shape of the grill 200, the shape of the irradiation areas 110, and the shape of the lens 140 correspond to each other as the diamond shape, a linear design is implemented, thereby intuitively recognizing the pattern of the grill 200 when the grill 200 is viewed from the outside. In addition, since the shape of the optic part 144 corresponds as the diamond shape, when the grill 200 is viewed, a diamond-shaped design may be clearly expressed. By implementing the pattern image of the grill 200 linearly, when the light of the optical modules 100 is irradiated through the grill 200 to deliver a message, the message may be intuitively recognized.

Meanwhile, the lens 140 may include: a transmitting layer 141 disposed on an outer side of the lens and transmitting the light therethrough; a reflecting layer 142 coupled to an inner side of the transmitting layer 141 and reflecting the light; and a coating layer 143 coupled to an inner side of the reflecting layer 142 and having a lower light transmittance than the transmitting layer 141, and the reflecting layer 142 and the coating layer 143 may include a plurality of perforated holes 111 spaced apart from each other, each being opened toward the transmitting layer 141 at the same position of the reflecting layer 142 and the coating layer 143, to form the plurality of irradiation areas 110.

As described above, the lens 140 includes the transmitting layer 141, the reflecting layer 142, and the coating layer 143. Here, the transmitting layer 141 is formed of a transparent plastic material, the reflecting layer 142 is formed of a material capable of reflecting light and coated on the transmitting layer 141, and the coating layer 143 is formed of a material having a low light transmission and coated on the reflecting layer 142. Here, the reflecting layer 142 and the coating layer 143 are formed of the same material as the grill 200 to impart a sense of identicalness with the grill 200. That is, since when the grill 200 is viewed from the outside, the reflecting layer 142 is visible through the transmitting layer 141, the grill 200 may look like jewelry, and the reflecting layer 142 and the coating layer 143 may prevent the inside of the grill 200 from being visible.

In particular, the reflecting layer 142 and the coating layer 143 include the plurality of the perforated holes 111 spaced apart from each other, each being opened toward the transmitting layer 141 at the same position of the reflecting layer 142 and the coating layer 143, to form the plurality of irradiation areas 110. That is, light irradiated from the optical module 100 may be emitted to the outside after passing through the transmitting layer 141 via the plurality of the perforated holes 111 formed in the reflecting layer 142 and the coating layer 143. Since the perforated hole 111, which is an opened portion for allowing light irradiated from the optical module 100 to be emitted to the outside, is formed at the same position of the reflecting layer 142 and the coating layer 143 and opened up to the transmitting layer 141, the light may be emitted to the outside after passing through the reflecting layer 142 and the coating layer 143.

By forming the perforated hole 111 in the reflecting layer 142 and the coating layer 143 while the transmitting layer 141, the reflecting layer 142, and the coating layer 143 of the lens 140 are formed to have a sense of identicalness with the grill 200, the light irradiated from the optical module 100 may be irradiated to the outside through the perforated hole 111, thereby implementing an illuminating function.

In addition, the lens 140 may include an outer lens 140-1 and an inner lens 140-2, the outer lens 140-1 including the transmitting layer 141, the reflecting layer 142, and the coating layer 143, and the inner lens 140-2 disposed inside the outer lens 140-1 and having a plurality of protrusions or grooves to scatter the light irradiated from the optical module 100.

While the lens 140 includes the outer lens 140-1 and the inner lens 140-2, the outer lens 140-1 may be formed to have a sense of identicalness with the grill 200, and the inner lens 140-2 may be configured to scatter the light irradiated from the optical module 100. Here, since the inner lens 140-2 is disposed inside the outer lens 140-1 and has the plurality of protrusions or grooves, the light irradiated from the optical module 100 may be scattered by the plurality of protrusions or grooves, thereby improving the visibility of the light.

Meanwhile, FIGS. 10 and 11 are views showing that a message is transmitted through the hidden light apparatus illustrated in FIG. 1. The optical module 100, which implements an illumination of a vehicle, is provided in the grill 200 to irradiate light through the grill 200. The grill may include a plurality of optical modules 100 configured to be individually turned on or off. By controlling the optical modules 100 to be individually turned on or off, it is possible to diversify a location at which the light is emitted from the grill 200 and an intensity of the light, thereby implementing various illuminating functions.

Specifically, the hidden light apparatus may further include a controller 300 individually controlling the optical modules 100 to be turned on or off. The controller 300 may perform control such that the plurality of the optical modules 100 are sequentially turned on or off or only some of the optical modules are turned on or off to implement an image for communication. Here, the controller 300 may control the optical modules 100 to be turned on or off according to a user's operation or by receiving various sensor signals. When the controller 300 controls the plurality of the optical modules 100 included in the grill 200 to be sequentially turned on or off from one direction to the other direction or vice versa, a luxurious design of the illumination may be implemented and a directional signal depending on a situation may be delivered to another vehicle's driver or a pedestrian. In addition, the controller 300 may control the plurality of the optical modules 100 such that only some of them are turned on or off to generate a message such as a text or a figure, thereby making it possible to deliver various messages for communication.

In the hidden light apparatus having the structure as described above, light is irradiated from the grill 200 of the vehicle, and when light is not irradiated, the shape of the irradiation area 110 and the pattern shape of the grill 200 are formed to be identical to each other, such that a design of the grill 200 can be maintained.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A hidden light apparatus for a vehicle, comprising:
a grill having a pattern including a plurality of holes;
a grid panel coupled to a respective one of the holes in a shape corresponding to a shape of the respective one of the holes to form an external surface covering the respective one of the holes;
a light source provided inside the external surface formed by the grid panel to irradiate light toward the grid panel; and
a reflector provided inside the external surface formed by the grid panel to allow the light irradiated from the light source to be incident thereto and reflecting the incident light to be moved toward the grid panel,
wherein when the light source is turned off, the grid panel constitutes the pattern of the grill, and when the light source is turned on, the grid panel functions to illuminate the vehicle as the light is irradiated through the grid panel by the reflector,
wherein the grid panel includes a plurality of irradiation areas corresponding to the respective one of the holes,
wherein the plurality of irradiation areas form a rhombic shape,
wherein an optical module includes the light source irradiating light, the reflector reflecting the light of the light source, and a lens forming the irradiation areas in which the light reflected through the reflector is emitted to outside the vehicle and formed in a shape of the pattern of the grill,
wherein the lens includes a plurality of optic parts protruding outwardly, each of the optic parts having a respective one of the irradiation areas,
wherein each of the optic parts includes an upper side surface and a lower side surface protruding at an angle from positions spaced apart from each other and extending to meet each other,
wherein each of the irradiation areas includes a perforated hole formed in an upper portion thereof and a non-perforated portion formed in a lower portion thereof, the perforated hole through which the light is transmitted and the non-perforated portion through which the light is not transmitted,
wherein the upper side surface and the lower side surface of the optic part extend at the same angle to meet each other, and
wherein a point at which the irradiation area is divided into the perforated hole and the non-perforated portion is disposed to be lower than a point at which the upper surface and the lower side surface of the optic part are connected to each other.

2. The hidden light apparatus of claim 1, wherein,
the grill includes a plurality of grid panels having a same shape as each other, and
a corresponding optical module is provided for at least some of the plurality of grid panels.

3. The hidden light apparatus of claim 1, wherein the grid panel includes the plurality of irradiation areas, wherein the plurality of irradiation areas form a grid shape.

4. The hidden light apparatus of claim 3, wherein, and the pattern of the grill and a shape of the irradiation areas of the optical module are a rhombic shape.

5. The hidden light apparatus of claim 3, wherein, and light of the optical module is irradiated to outside the vehicle through the perforated hole formed in each of the irradiation areas.

6. The hidden light apparatus of claim 5, wherein an entire area of the perforated hole is greater than at least ½ of an entire area of the irradiation area.

7. The hidden light apparatus of claim 5, wherein the perforated hole is located in an upper portion of the irradiation area, and a non-perforated portion through which the light is not transmitted is formed in a lower portion of the irradiation area.

8. The hidden light apparatus of claim 1, wherein a shape of the optic parts constitutes the pattern of the grill.

9. The hidden light apparatus of claim 1, wherein the pattern of the grill, a shape of the lens, a shape of the irradiation areas, and a shape of the optic parts are a rhombic shape.

10. The hidden light apparatus of claim 1, wherein the lens includes:
- a transmitting layer disposed on an outer side of the lens and transmitting the light therethrough;
- a reflecting layer coupled to an inner side of the transmitting layer and reflecting the light; and
- a coating layer coupled to an inner side of the reflecting layer and having a lower light transmittance than the transmitting layer, and
- the reflecting layer and the coating layer include the plurality of perforated holes spaced apart from each other, each being opened toward the transmitting layer at the same position of the reflecting layer and the coating layer, to form the plurality of irradiation areas.

11. The hidden light apparatus of claim 10, wherein the lens includes an outer lens and an inner lens, the outer lens including the transmitting layer, the reflecting layer, and the coating layer, and the inner lens disposed inside the outer lens and having a plurality of protrusions or grooves to scatter the light irradiated from the optical module.

\* \* \* \* \*